US012782116B2

(12) United States Patent
Tatarczak et al.

(10) Patent No.: US 12,782,116 B2
(45) Date of Patent: Nov. 3, 2026

(54) SENSOR WITH ADDRESSABLE DEPTH RANGE AND/OR FIELD OF VIEW AND COMPUTING DEVICE WITH SUCH SENSOR

(71) Applicant: II-VI Delaware, Inc., Wilmington, DE (US)

(72) Inventors: Anna Tatarczak, Felton, CA (US); Dmitri Iazikov, Eugene, OR (US); Christopher Kocot, San Jose, CA (US)

(73) Assignee: II-VI DELAWARE, INC., Wilmington, DE (US)

( * ) Notice: Subject to any disclaimer, the term of this patent is extended or adjusted under 35 U.S.C. 154(b) by 906 days.

(21) Appl. No.: 18/080,879

(22) Filed: Dec. 14, 2022

(65) Prior Publication Data

US 2024/0200933 A1 Jun. 20, 2024

(51) Int. Cl.
*G01B 11/22* (2006.01)
*G01S 17/89* (2020.01)

(52) U.S. Cl.
CPC .............. *G01B 11/22* (2013.01); *G01S 17/89* (2013.01)

(58) Field of Classification Search
CPC ................................ G01B 11/22; G01S 17/89
See application file for complete search history.

(56) References Cited

U.S. PATENT DOCUMENTS 6,504,171 B1 1/2003 Grillot et al.
6,525,335 B1 2/2003 Krames et al.
6,630,692 B2 10/2003 Goetz et al.
6,943,381 B2 9/2005 Gardner et al.
6,961,491 B2 11/2005 Greiner et al.
6,965,716 B2 11/2005 Greiner et al.
6,985,656 B2 1/2006 Iazikov et al.
6,993,223 B2 1/2006 Greiner et al.
7,181,103 B1 2/2007 Greiner et al.
7,190,858 B1 3/2007 Greiner et al.

(Continued)

FOREIGN PATENT DOCUMENTS

DE 102019220409 6/2021
EP 1246259 10/2002

(Continued)

OTHER PUBLICATIONS

Extended European Search Report for U.S. Appl. No. 23/172,159, completed Sep. 28, 2023, 8 pages.

(Continued)

*Primary Examiner* — Helal A Algahaim
*Assistant Examiner* — Evan H Haut
(74) *Attorney, Agent, or Firm* — McAndrews, Held & Malloy, Ltd.

(57) ABSTRACT

Sensors with an addressable depth range and/or field of view are disclosed. Computing devices with such sensors are also disclosed. A sensor may include multiple output couplers that are positioned at different distances from a receiver. Through selective enabling of the output couplers, light or other radiation generated by a transmitter may be directed toward the output couplers and selectively emitted from the sensor at different distances from the transmitter. Such selective emitting may adjust a depth range and/or field of view of the sensor. A computing device may include a single sensor that is used across applications and/or processes having different needs with regard to depth range and/or field of view.

20 Claims, 4 Drawing Sheets

(56) References Cited

U.S. PATENT DOCUMENTS

| | | | |
|---|---|---|---|
| 7,194,164 | B2 | 3/2007 | Iazikov et al. |
| 7,203,401 | B2 | 4/2007 | Mossberg et al. |
| 7,260,290 | B1 | 8/2007 | Greiner et al. |
| 7,286,732 | B2 | 10/2007 | Greiner et al. |
| 7,292,755 | B1 | 11/2007 | Greiner et al. |
| 7,327,908 | B1 | 2/2008 | Iazikov et al. |
| 7,330,614 | B1 | 2/2008 | Mossberg et al. |
| 7,333,692 | B1 | 2/2008 | Mossberg et al. |
| 7,345,324 | B2 | 3/2008 | Bour et al. |
| 7,359,597 | B1 | 4/2008 | Iazikov et al. |
| 7,519,248 | B2 | 4/2009 | Iazikov et al. |
| 7,643,400 | B1 | 1/2010 | Iazikov et al. |
| 7,676,128 | B1 | 3/2010 | Mossberg et al. |
| 7,720,334 | B1 | 5/2010 | Mossberg et al. |
| RE41,570 | E | 8/2010 | Greiner et al. |
| 7,773,842 | B2 | 8/2010 | Greiner et al. |
| RE42,206 | E | 3/2011 | Mossberg et al. |
| RE42,407 | E | 5/2011 | Iazikov et al. |
| RE42,540 | E | 7/2011 | Iazikov et al. |
| RE43,226 | E | 3/2012 | Iazikov et al. |
| 8,169,703 | B1 | 5/2012 | Mossberg et al. |
| 8,180,188 | B2 | 5/2012 | Mossberg et al. |
| 8,989,537 | B2 | 3/2015 | Mossberg et al. |
| 9,297,937 | B1 | 3/2016 | Greiner et al. |
| 9,310,535 | B1 | 4/2016 | Greiner et al. |
| 9,628,216 | B2 | 4/2017 | Lyubomirsky et al. |
| 9,703,042 | B2 | 7/2017 | Mossberg et al. |
| 9,941,864 | B2 | 4/2018 | Daghighian et al. |
| 10,254,450 | B1 | 4/2019 | Greiner et al. |
| 10,459,169 | B2 | 10/2019 | Xu et al. |
| 10,539,723 | B2 | 1/2020 | Iazikov et al. |
| 10,823,889 | B2 | 11/2020 | Mossberg et al. |
| 11,378,724 | B2 | 7/2022 | Mossberg et al. |
| 11,686,881 | B2 | 6/2023 | Iazikov et al. |
| 2002/0127751 | A1 | 9/2002 | Gardner et al. |
| 2009/0285529 | A1 | 11/2009 | Iazikov et al. |
| 2014/0300966 | A1* | 10/2014 | Travers et al. ........ G02B 27/42 |
| 2015/0132003 | A1 | 5/2015 | Greiner et al. |
| 2015/0309220 | A1 | 10/2015 | Greiner et al. |
| 2018/0180733 | A1* | 6/2018 | Smits ...................... G01S 17/02 |
| 2019/0041634 | A1 | 2/2019 | Popovich et al. |
| 2019/0079293 | A1* | 3/2019 | Alexander et al. .... G02B 27/01 |
| 2020/0200357 | A1 | 6/2020 | Gray et al. |
| 2020/0205942 | A1 | 7/2020 | Pesach et al. |
| 2021/0026047 | A1 | 1/2021 | Greiner et al. |
| 2022/0221631 | A1 | 7/2022 | Greiner et al. |
| 2023/0106643 | A1* | 4/2023 | Tang et al. ............ G01S 7/4863 |
| 2023/0152708 | A1 | 5/2023 | Greiner et al. |
| 2023/0333285 | A1 | 10/2023 | Iazikov et al. |

FOREIGN PATENT DOCUMENTS

| | | | |
|---|---|---|---|
| JP | H02008710 | A | 1/1990 |
| JP | H06249648 | A | 9/1994 |
| JP | 2014176495 | A | 9/2014 |
| JP | 2018088605 | A | 6/2018 |
| JP | 2022134990 | A | 9/2022 |
| WO | 2004104663 | | 12/2004 |

OTHER PUBLICATIONS

Japanese Office Action for Application No. 2024-068104, dated Feb. 4, 2025, 5 pages.

Japanese Office Action for Application No. 2024-068104, dated Jun. 26, 2025, 6 pages.

* cited by examiner

SENSOR WITH ADDRESSABLE DEPTH RANGE AND/OR FIELD OF VIEW AND COMPUTING DEVICE WITH SUCH SENSOR

BACKGROUND

Consumer electronic devices such as smartphones may include Lidar modules and/or other sensor modules, which permit such consumer electronic devices to generate or sense a 3D scan of a spatial region. Consumer electronic devices may use such 3D scan data as part of a facial recognition process, a biometric authentication process, augmented reality process, autofocusing process, and/or another process. The effectiveness of such processes may be dependent upon the designed scanning or sensing range of the Lidar modules and/or other sensor modules. Moreover, one scanning range may not be sufficient for all processes for which the consumer electronic device may want to utilize captured 3D scan data. As such, the consumer electronic device may include multiple Lidar modules and/or other sensor modules in order to provide the scanning ranges required by the various processes.

BRIEF SUMMARY OF THE DISCLOSURE

Shown in and/or described in connection with at least one of the figures, and set forth more completely in the claims are sensors with addressable depth range and/or field of view and computing devices with such sensors.

These and other advantages, aspects and novel features of the present disclosure, as well as details of illustrated embodiments thereof, will be more fully understood from the following description and drawings.

BRIEF DESCRIPTION OF THE DRAWINGS

The various features and advantages of the present disclosure may be more readily understood with reference to the following detailed description taken in conjunction with the accompanying drawings, wherein like reference numerals designate like structural elements.

DESCRIPTION

Figure 1:
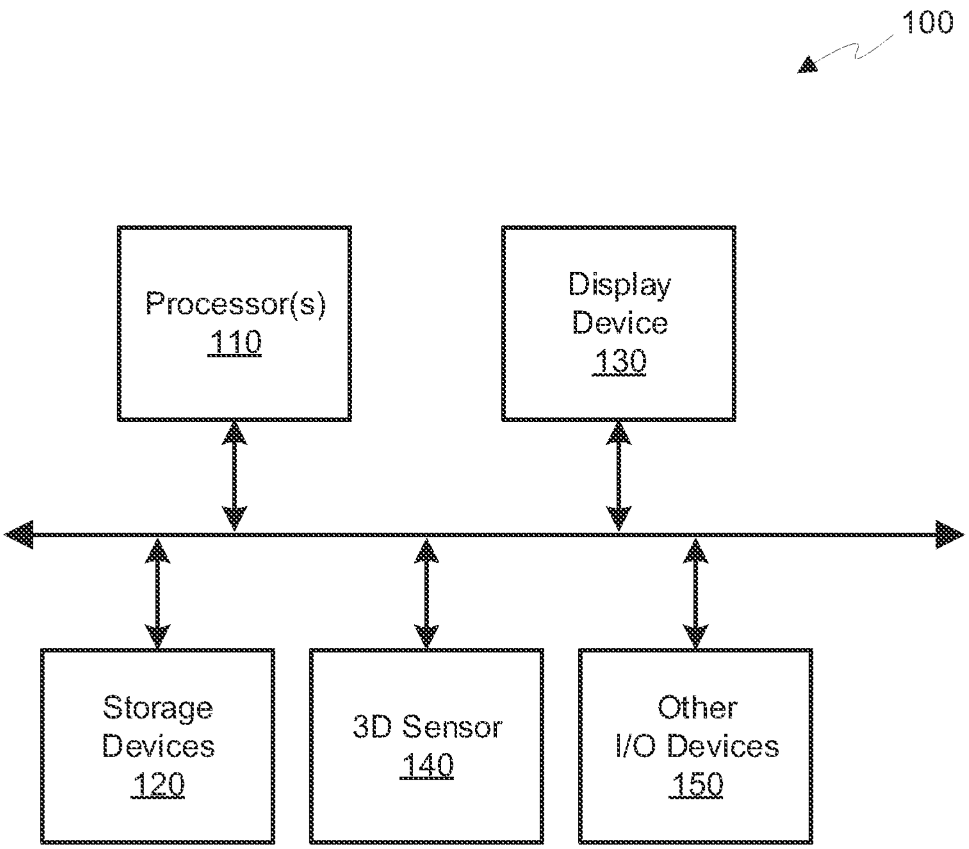
FIG. 1 depicts a block diagram of a computing device comprising a sensor having addressable depth range and/or field of view aspects per aspects of the present disclosure.

The following discussion provides various examples of sensors and computing devices. Such examples are non-limiting, and the scope of the appended claims should not be limited to the particular examples disclosed. In the following discussion, the terms "example" and "e.g." are non-limiting.

The figures illustrate the general manner of construction, and descriptions and details of well-known features and techniques may be omitted to avoid unnecessarily obscuring the present disclosure. In addition, elements in the drawing figures are not necessarily drawn to scale. For example, the dimensions of some of the elements in the figures may be exaggerated relative to other elements to help improve understanding of the examples discussed in the present disclosure. The same reference numerals in different figures denote the same elements.

The term "or" means any one or more of the items in the list joined by "or". As an example, "x or y" means any element of the three-element set {(x), (y), (x, y)}. As another example, "x, y, or z" means any element of the seven-element set {(x), (y), (z), (x, y), (x, z), (y, z), (x, y, z)}.

The terms "comprises," "comprising," "includes," and/or "including," are "open ended" terms and specify the presence of stated features, but do not preclude the presence or addition of one or more other features.

The terms "first," "second," etc. may be used herein to describe various elements, and these elements should not be limited by these terms. These terms are only used to distinguish one element from another. Thus, for example, a first element discussed in this disclosure could be termed a second element without departing from the teachings of the present disclosure.

Unless specified otherwise, the term "coupled" may be used to describe two elements directly contacting each other or describe two elements indirectly connected by one or more other elements. For example, if element A is coupled to element B, then element A can be directly contacting element B or indirectly connected to element B by an intervening element C. Similarly, the terms "over" or "on" may be used to describe two elements directly contacting each other or describe two elements indirectly connected by one or more other elements.

Generally, aspects of the present disclosure are directed to sensors with an addressable depth range and/or field of view. Further aspects of the present disclosure are directed to computing devices with such sensors. To this end, a sensor may include multiple output couplers that are positioned at different distances from a receiver. Through selective enabling of the output couplers, light or other radiation generated by a transmitter may be directed toward the output couplers and selectively emitted from the sensor at different distances from the transmitter. Such selective emitting may adjust a depth range and/or field of view of the sensor. In this manner, a computing device may include a single sensor which the computing device may utilize across applications and/or processes having different needs with regard to depth range and/or field of view.

Referring to FIG. 1, a block diagram depiction of a computing device 100 is shown that includes a sensor 140 with addressable depth range and/or field of view. In particular, the computing device 100 may include one or more processors 110, one or more storage devices 120, a display device 130, the sensor 140, and various input/output (I/O) devices 150. The computing device 100 may further include buses and/or other interconnects that operatively couple the processor(s) 110, storage device(s) 120, display device 130, sensor 140, and I/O device(s) 150 to one another. A processor 110 may be configured to execute instructions, manipulate data, and control operation of other components of the computing device 100 as a result of executing such instructions. To this end, the processors 110 may include a general purpose processor such as, for example, an x86 processor, an ARM processor, etc., which are available from various vendors. However, the processor 110 may also be implemented using an application specific processor and/or other analog and/or digital logic circuitry.

The storage devices 120 may include one or more volatile storage devices and/or one or more non-volatile storage devices. In general, a storage device 120 may store software and/or firmware instructions, which may be executed by a processor 110. The storage devices 120 may further store various types of data which the processor 110 may access, modify, and/otherwise manipulate in response to executing instructions. To this end, the storage device 120 may include random access memory (RAM) device(s), read only memory (ROM) device(s), sold state device (SSD) drive(s), flash memory device(s), etc. In some embodiments, one or more devices of the storage devices 120 may be integrated with one or more processors 110.

The display device 130 may present visual output resulting from execution of instructions of the processor 110. To this end, the display device 130 may include one or more liquid-crystal display (LCD) devices, liquid-crystal on silicon (LCoS) devices, light-emitting diode (LED) devices, organic light-emitting diode (OLED) device, quantum dot devices, interferometric modulator device, or some other display device.

As explained in greater detail below, the sensor 140 may include a transmitter and a receiver that cooperate to generate a 3D scan of a spatial region within its addressable depth range and/or field of view. The computing device 100 may use the generated 3D scan data as part of a facial recognition process, a biometric authentication process, an augmented reality process, an autofocusing process, and/or another process. In particular, the processor 110 may execute instructions of an operating system, device driver, application, and/or some other software and/or firmware module resulting in the generation of control signals that adjust a depth range and/or field of view of the sensor 140.

The other I/O devices 150 may provide devices which enable a user or another device (e.g., another computing device, networking device, etc.) to interact with the computing device 100. For example, the I/O devices 150 may include buttons, touch screens, keyboards, microphones, audio speakers, etc. via which a person may interact with the computing device 100. The I/O devices 150 may also include network interfaces that permit the computing device 100 to communicate with other computing devices and/or networking devices. To this end, the networking interfaces may include a wired networking interface such as an Ethernet (IEEE 802.3) interface; a wireless networking interface such as a WiFi (IEEE 802.11) interface, BlueTooth (IEEE 802.15.1) interface; a radio or mobile interface such as a cellular interface (GSM, CDMA, LTE, etc.), and/or some other type of networking interface capable of providing a communications link between the computing device 100 and another computing device and/or networking device.

The above describes aspects of the computing device 100. However, there may be significant variation in actual implementations of the computing device 100. For example, a smart phone implementation of the computing device 100 may use vastly different components and may have a vastly different architecture than a laptop implementation of the computing device 100. Despite such differences, computing devices still generally include processors that execute software and/or firmware instructions in order to implement various functionality. As such, the above described aspects of the computing device 100 are not presented from a limiting standpoint but from a generally illustrative standpoint.

Certain aspects of the present disclosure may be especially useful for computing devices implemented as mobile consumer electronic devices (e.g., smartphones, tablets, laptops, etc.). However, the present disclosure envisions that aspects will find utility across a vast array of different computing devices and/or computing platforms and the intention is not to limit the scope of the present disclosure to a specific computing device and/or computing platform beyond any such limits that may be found in the appended claims.

Figure 2A:
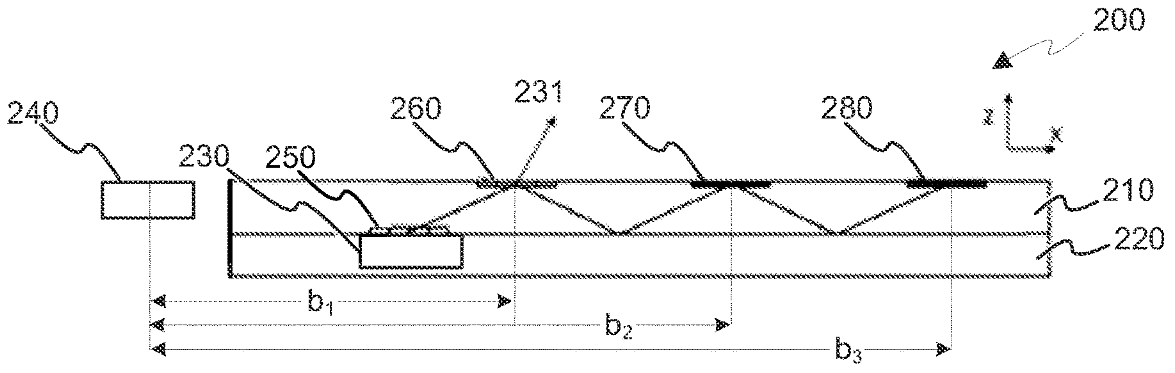
FIGS. 2A-2C depict an embodiment of a sensor and/or further features of the sensor shown in FIG. 1.
Figure 2B:
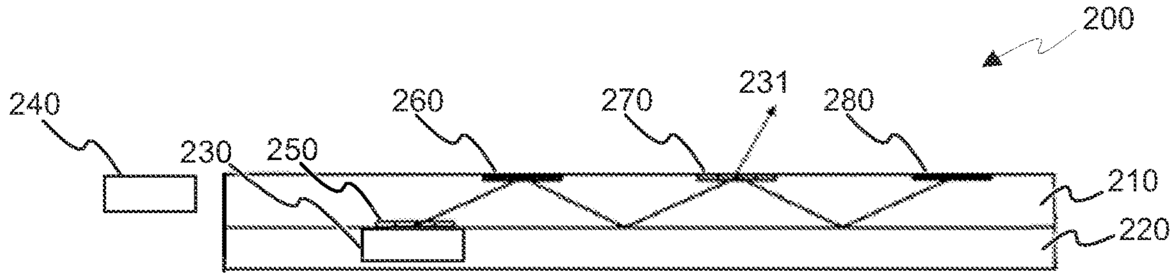
Figure 2C:
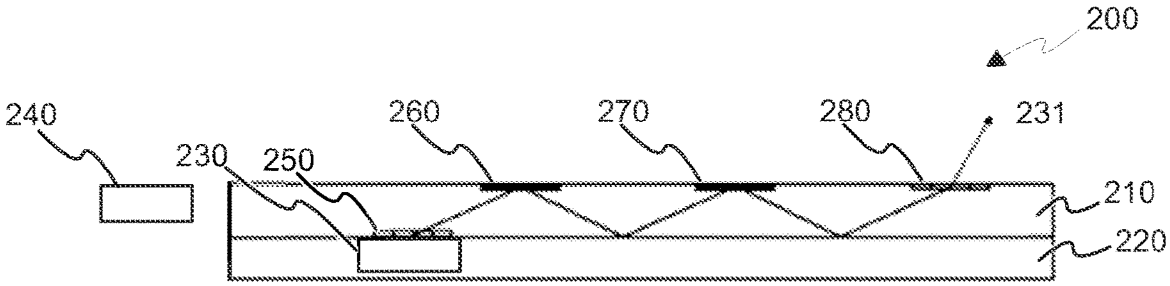

Referring now to FIG. 2A-2C, block diagrams for a sensor 200 are shown, which may implement the sensor 140 of FIG. 1. In particular, FIG. 2A depicts the sensor 200 configured to provide a first depth range, FIG. 2B depicts the sensor 200 configured to provide a second depth range that is greater than the first depth range, and FIG. 2C depicts the sensor 200 configured to provide a third depth range that is greater than the second depth range.

As shown, the sensor 200 may include a guide 210 (e.g., a light guide or a waveguide), an integrated circuit device 220, a transmitter 230, a receiver 240, an input coupler 250, a first output coupler 260, a second output coupler 270, and a third output coupler 280. In various embodiments, the sensor 200 may provide an infrared (IR) based 3D scanning hardware solution for consumer electronics, Lidar modules, and/or other 3D scanning environments. In response to control signals, sensor 200 may selectively enable or activate individual couplers of the couplers 260, 270, 280, which dynamically configure the sensor 200 to provide a desired addressable depth range and/or field of view.

In certain embodiments, the guide 210 may be placed over the display device 130 (e.g., OLED screen) of the computing device 100. As shown, the guide 210 may be positioned or formed over a top side of an integrated circuit device 220 such that a bottom side of the guide 210 is on the top side of the integrated circuit device 220. The guide 210 may include the input coupler 250 along a bottom side of the guide 210 and over the transmitter 230. The guide 210 may further include the output couplers 260, 270, 280 along a top side of the guide 210. The input coupler 250 may couple an output of the transmitter 230 to the guide 210 so that the guide 210 may guide or direct the output of the transmitter 230 toward the output couplers 260, 270, 280.

The integrated circuit device 220 may include the transmitter 230. In various embodiments, the integrated circuit device 220 may include additional circuitry and/or components directed to the operation of the sensor 200 and/or directed to other functionality. Furthermore, in various embodiments, the transmitter 230 may be implemented as a device separate from the integrated circuit device 220.

The transmitter 230 may generate a beam 231 of light and/or other radiation based on control signals received by the sensor 200. In various embodiments, the transmitter 230 may generate a beam 231 of infrared (IR) light, which is emitted by the sensor 200 via a selected output coupler 260, 270, 280 to perform an IR scan of a spatial region per the selected addressable depth range. To this end, the transmitter 230 may include a vertical-cavity surface-emitting laser (VCSEL) array, a light-emitting diode (LED), and/or another infrared source. While the sensor 200 in various embodiments may use a beam of infrared light to generate a 3D scan of a spatial region, the transmitter 230 may generate beam(s) of other forms of radiation and the guide 210 may be manufactured to guide such beam(s) to the output couplers 260, 270, 280 so as to generate 3D scan data using such directed beam(s).

The receiver 240 may be positioned to receive, capture, and/or detect the beam 231 of the transmitter 230 after such beam 231 is emitted from the sensor 200 and reflected by object(s) within a scanning or depth range of the sensor 200. To this end, the receiver 240 may include an image sensor such as a charge-coupled device (CCD) image sensor, complementary metal-oxide semiconductor (CMOS) image sensor, or some other image sensor or camera suitable for receiving the beam 231 emitted by the transmitter 230. As such, the receiver 240 may be separate from the integrated circuit device 220. However, in various embodiments, the receiver 240 may be integrated with the integrated circuit device 220 and transmitter 230.

The processor 110 may generate control signals that dynamically control material properties of the output couplers 260, 270, 280. In this manner, the processor 110 may selectively configure each output coupler 260, 270, 280 between a total internal reflection (TIR) state, in which the respective coupler 260, 270, 280 confines the beam 231 to the guide 210, and an out-coupling state, in which the respective coupler 260, 270, 280 permits the beam 231 to escape the guide 210 via the respective coupler 260, 270, 280. In particular, the processor 110 as a result of executing system level software, may generate voltage, current, differential, and/or other control signals that selectively alter properties of the output couplers 260, 270, 280 so as to place respective output couplers 260, 270, 280 in a TIR state or an out-coupling state. Through the generation of such control signals, the sensor 200 may be configured to illuminate a depth range and/or field of view of interest.

Confinement in the guide 210 may be achieved by a reflective coating along the top side and bottom side of the guide 210. The reflective coating may have a high reflectivity at glazing angles and low reflectivity at near normal angles. The reflective coating may be selectively removed from areas where the beam is to be out coupled via the output couplers 260, 270, 280.

The output couplers 260, 270, 280 may be implemented based on prismatic, diffractive, or metasurface properties. In particular, the output couplers 260, 270, 280 may be placed in the guide 210 by embedding or etching in the guide 210 or by mounting on the top side of the guide 210. In certain embodiments, the output couplers 260, 270, 280 may comprise an active material and a metasurface optical element (MOE) designed for a specific material refractive index in grooves of the output couplers 260, 270, 280. In other embodiments, the output couplers 260, 270, 280 may comprise an active layer on the top side of the guide 210. In such embodiments, the guide 210 may comprise a silicon layer and the active layer of the output couplers 260, 270, 280 may comprise a liquid crystal on silicon (LCOS) layer. In yet other embodiments, the guide 210 itself may comprise an active layer and the output couplers 260, 270, 280 may be formed in the bulk of the active layer. In such embodiments, the output couplers 260, 270, 280 may use any region within the active layer of the guide 210 that is not required to maintain an exact refractive index.

As noted, the sensor 200 may be configured to provide a desired scanning or depth range. As shown in FIGS. 2A-2C, each output coupler 260, 270, 280 may be positioned at a different distance from the receiver 240. The processor 110 may enable output coupler 260 to emit the beam 231 at a first baseline distance $b_1$ from the receiver 240. See, e.g., FIG. 2A. Similarly, the processor 110 may enable output coupler 270 to emit the beam 231 at a second baseline distance $b_2$ from the receiver 240, wherein the second baseline distance $b_2$ is greater than first baseline distance $b_1$. See, e.g., FIG. 2B. Moreover, the processor 110 may enable output coupler 280 to emit the beam 231 at a third baseline distance $b_3$ from the receiver 240, wherein the third baseline distance $b_3$ is greater than second baseline distance $b_2$. See, e.g., FIG. 2C.

A depth range or scanning range z of the sensor 200 is proportional to the baseline distance b between emitted beam 231 and the receiver 240 and may be represented by:

$$z = f\frac{b}{d} \qquad \text{Equation 1}$$

where z corresponds to the depth or scanning range, f corresponds to the focal length of the emitted beam 231, b corresponds to the baseline distance, d corresponds to the disparity between the focal length f and the location of the scanned object. By varying the baseline distance (i.e., distance between the receiver 240 and the emitted beam 231), the processor 110 may configure the sensor for different depth ranges and thus may generate 3D scans of objects at differing distances z from the sensor 200.

Figure 3:
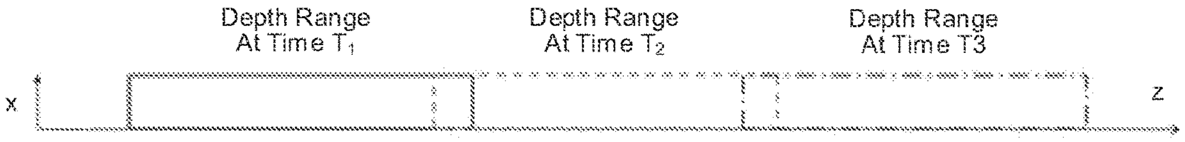
FIG. 3 depicts depth ranges associated with the output couplers of FIG. 2A-2C.
Figure 4:
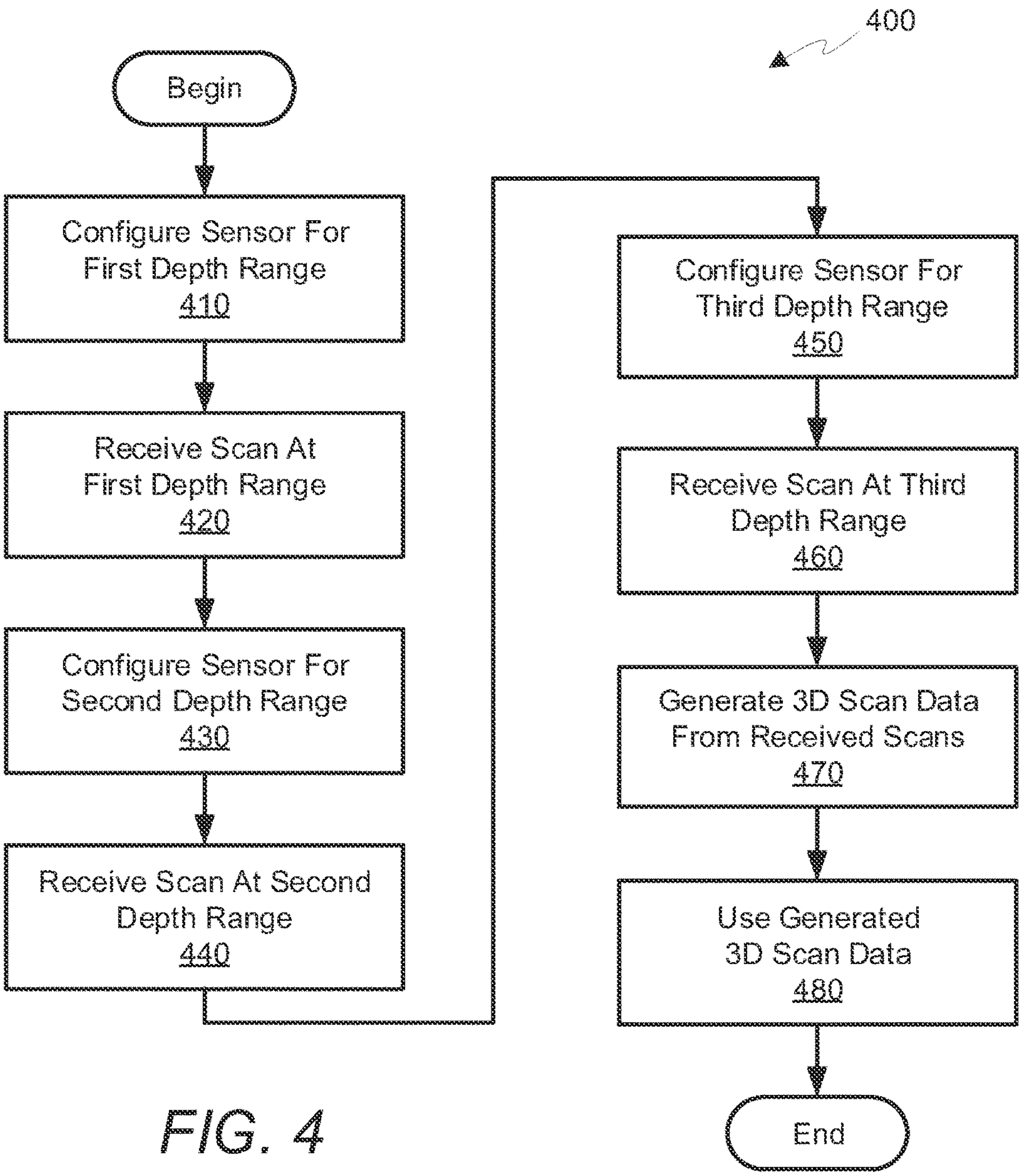
FIG. 4 depicts a flowchart for a process of using the sensor of FIGS. 2A-2C to generate 3D scan data.

Referring now to FIGS. 3 and 4, an example process 400 of generating 3D scan data is shown. In various embodiments, the sensor 200 may be designed such that the depth ranges associated with the output couplers 260, 270, 280 overlap. See, e.g., FIG. 3. For such embodiments, the process 400 may perform multiple scans of an object across time, wherein each scan uses a different output coupler 260, 270, 280 and thus a different depth range z. The process 400 may utilize data received for a same region from multiple scans and potentially use such redundant data to improve the accuracy of resulting 3D scan data.

To this end, the processor 110 at 410 may generate control signals that configure the sensor 200 for a first depth range. For example, the processor 110 may enable the output coupler 260 and disable the output couplers 270, 280 so that beam 231 is emitted from output coupler 260 at a first baseline distance $b_1$. At time $T_1$, the receiver 240 may receive the beam 231 emitted at the first baseline distance $b_1$ as the beam 231 is reflected by the scanned object. The processor 110 at 420 may receive, from the receiver 240, the scan data generated from the beam 231 emitted at the first baseline distance $b_1$.

After receiving the data for the first baseline distance $b_1$, the processor 110 at 430 may generate control signals that configure the sensor 200 for a second depth range. For example, the processor 110 may enable the output coupler 270 and disable the output couplers 260, 280 so that beam 231 is emitted from output coupler 270 at a second baseline distance $b_2$. At time $T_2$, the receiver 240 may receive the beam 231 emitted at the second baseline distance $b_2$ as the beam 231 is reflected by the scanned object. The processor 110 at 440 may receive, from the receiver 240, the scan data generated from the beam 231 emitted at the second baseline distance $b_2$.

After receiving the data for the second baseline distance $b_2$, the processor 110 at 450 may generate control signals that configure the sensor 200 for a third depth range. For example, the processor 110 may enable the output coupler 280 and disable the output couplers 260, 270 so that beam 231 is emitted from output coupler 280 at a third baseline distance $b_3$. At time $T_3$, the receiver 240 may receive the beam 231 emitted at the third baseline distance $b_3$ as the beam 231 is reflected by the scanned object. The processor 110 at 460 may receive, from the receiver 240, the scan data generated from the beam 231 emitted at the third baseline distance $b_3$.

The processor 110 at 470 may generate 3D scan data based on the data received for the each of the baseline distances. In particular, the processor 110 may utilize various interpolation techniques in an attempt to improve accuracy of the 3D scan data, especially for zones of the scan that are overlapped by the depth ranges. In general, depth error is the lowest at the center of a scanned depth range. Overlapping zones results in the processor 110 receiving multiple data points for portions at the boundaries of the depth ranges. Through interpolation techniques (e.g., point-wise averaging, window averaging, etc.), the processor 110 may utilize these multiple or redundant data points to improve accuracy of the depth sensing and decrease depth error in the generated 3D scan data.

At 480, the processor 110 may utilized the generated 3D scan data. In particular, the processor 110 may use the generated 3D scan data as part of a facial recognition process, a biometric authentication process, an augmented reality process, an autofocusing, and/or another process.

Figure 5:
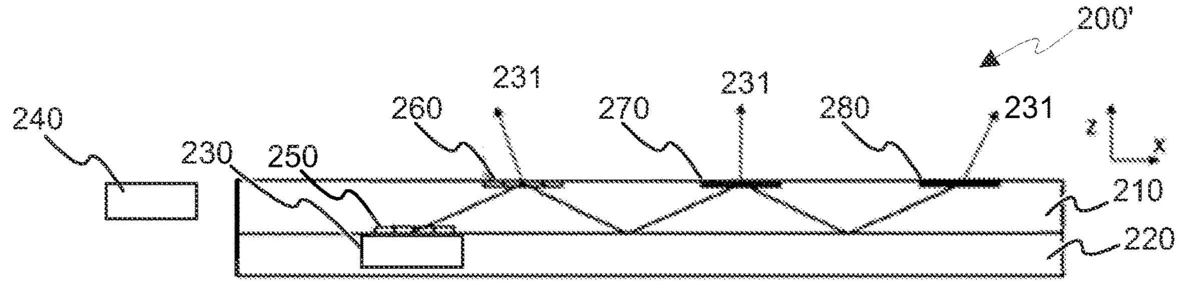
FIG. 5 depicts another embodiment of a sensor and/or further features of the sensor shown FIG. 1.

Referring now to FIG. 5, a sensor 200' is shown with an addressable field of view. In particular, the output couplers 260, 270, 280 may each be implemented with diffractive gratings of different periods (e.g., distances between repeated grating structures differ). Due to such different periods of the diffractive gratings, each output coupler 260, 270, 280 may have a different field of view. In FIG. 5, the output couplers 260, 270, 280 are all depicted as out-coupling in order to show that an angle of the emitted beam 231 may differ for each of the output couplers 260, 270, 280 and that each of the output couplers 260, 270, 280 may provide a different field of view. Thus, the processor 110 may enable a single output coupler 260, 270, 280 in order to configure the sensor 200' for a desired field of view. For example, a single output coupler 260, 270, 280 may be selected in order to illuminate a portion of the field of view of interest. The field of view may be selected based on where an object to be scanned is identified by another sensor such as a camera not shown. Moreover, a single field of view may be illuminated at a higher output power while still maintaining the output power at level within eye safety limits.

Figure 6:
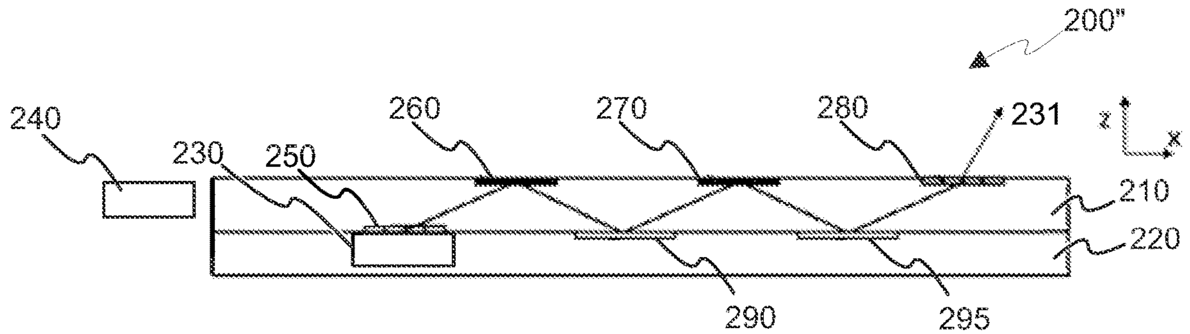
FIG. 6 depicts a further embodiment of a sensor and/or further features of the sensor shown in FIG. 1.

Referring now to FIG. 6, a sensor 200" is shown with additional optical structures 290, 295 between the transmitter 230 and one or more of the output couplers 260, 270, 280. In various embodiments, the optical structures 290, 295 are added via respective structural patterns at or near the reflection surfaces of the guide 210 and positioned before respective output couplers 270, 280. While not shown, the sensor 200" may further include an optical structure between the transmitter 230 and the output coupler 260 in some embodiments. Each optical structure 290, 295 may comprise a lens or diffractive optical element (DOE) that focuses the beam 231, a collimator that collimates the beam 231, a polarizing filter that polarizes the beam 231, a wavelength filter that reduces certain wavelengths of the beam 231, a diffuser that scatters the beam 231, etc. prior to the respective output couplers 260, 270, 280. By adding the optical structures 290, 295, the beam 231 may be focused/reshaped for certain applications (e.g., far field applications).

The guide 210 may also provide optical structures on a top side or over each output coupler 260, 270, 280. For example, the guide 210 may provide the output coupler 260 with a diffractive optical element (DOE), the output coupler 270 with a diffuser, and the output coupler 280 with a focusing lens. Other embodiments may pair such optical structures with the output couplers 260, 270, 280 in a different manner and/or may combine optical structures for a single output coupler of the output couplers 260, 270, 280. Such flexibility in mixing-and-matching the optical structures for each output coupler 260, 270, 280 and such selectivity with regard to which of the output couplers 260, 270, 280 are placed in an out-coupling state may enable using a single transmitter 230 (e.g., a single IR source, a single VCSEL array, etc.) to support multiple IR based applications such as structured light, illumination, proximity sensing. Optical structures may be also formed within the guide 210.

For various applications, it may be desirable for the processor 110 to simultaneously enable multiple couplers 260, 270, 280. As such, the processor 110 and/or the sensors 200, 200', 200" may not be limited to out-coupling only via a single output coupler 260, 270, 280. Instead, the processor 110 and/or sensors 200, 200', 200" may permit out-coupling via various combinations of the output couplers 260, 270, 280. Furthermore, while sensors 200, 200', 200" are depicted with three output couplers, other embodiments of the sensors 200, 200', 200" may include a fewer number of output couplers and some embodiments of the sensors 200, 200', 200" may include a greater number of output couplers.

The present disclosure includes reference to certain examples, however, it will be understood by those skilled in the art that various changes may be made and equivalents may be substituted without departing from the scope of the disclosure. In addition, modifications may be made to the disclosed examples without departing from the scope of the present disclosure. Therefore, it is intended that the present disclosure not be limited to the examples disclosed, but that the disclosure will include all examples falling within the scope of the appended claims.

What is claimed is:

1. A sensor, comprising:
a receiver;
output couplers;
a transmitter configured to emit a beam; and
a guide configured to receive the beam emitted by the transmitter and guide the beam toward the output couplers; and
wherein each output coupler may be selectively placed, based on a control signal, in an out-coupling state that emits the beam from the respective output coupler and an internal reflective state that confines the beam to the guide;
wherein a first output coupler of the output couplers, when placed in the out-coupling state, emits the beam so as to provide the sensor with a first sensing depth range;
wherein a second output coupler of the output couplers, when placed in the out-coupling state, emits the beam so as to provide the sensor with a second sensing depth range; and
wherein the receiver is configured to receive beams reflected by one or more objects in the first sensing depth range in response to the first output coupler emitting the beam and to receive beams reflected by one or more objects in the second sensing depth range in response to the second output coupler emitting the beam.

2. The sensor of claim 1, wherein
the first output coupler is at a first baseline distance from the receiver;
the second output coupler is at a second baseline distance from the receiver; and
the second baseline distance is greater than the first baseline distance.

3. The sensor of claim 1, wherein the second sensing depth range differs from the first sensing depth range.

4. The sensor of claim 3, wherein the first sensing depth range overlaps a portion of the second sensing depth range.

5. The sensor of claim 1, wherein:
the first output coupler provides a first field of view; and the second output coupler provides a second field of view that differs from the first field of view.

6. The sensor of claim 5, wherein:

the first output coupler comprises a first diffractive grating comprising first repeated grating structures having a first period; and the second output coupler comprises a second diffractive grating comprising grating structures having a second period that differs from the first period.

7. The sensor of claim 1, comprising:

a first optical structure between the transmitter and the first output coupler of the output couplers; and a second optical structure between the transmitter and the second output coupler of the output couplers.

8. The sensor of claim 7, wherein the first optical structure and the second optical structure each include a lens, a diffractive optical element, a collimator, a polarizing filter, a wavelength filter, or a diffuser.

9. The sensor of claim 1, comprising:

optical structures over the output couplers; and wherein the first output coupler emits the beam through a first optical structure in response to the first output coupler being placed in the out-coupling state.

10. The sensor of claim 9, wherein each optical structure includes a lens, a diffractive optical element, a collimator, a polarizing filter, a wavelength filter, or a diffuser.

11. A computing device, comprising:

a receiver;

a first output coupler associated with a first sensing depth range;

a second output coupler associated with a second sensing depth range;

a transmitter configured to emit a beam;

a guide configured to receive the beam emitted by the transmitter and guide the beam toward the first and second output couplers;

a storage dive comprising instructions; and a processor configured to execute the instructions, wherein execution of the instructions causes the process to:

generate first control signals that place the first output coupler in an internal reflective state in which the second output coupler confines the beam to the guide; and generate second control signals that place the second output coupler in an out-coupling state in which the second output coupler emits the beam and that place the first output coupler in an internal reflective state in which the second output coupler confines the beam tot eh guide; and wherein the receiver is configured to receive the beam as reflected by one or more objects in the first sensing depth range, when emitted from the first output coupler, and receive the beam as reflected by one or more objects in the second sensing depth range, when emitted from the second output coupler.

12. The computing device of claim 11, wherein:

the first output coupler is at a first baseline distance from the receiver;

the second output coupler is at a second baseline distance from the receiver; and the second baseline distance is greater than the first baseline distance.

13. The computing device of claim 11, wherein the first sensing depth range overlaps a portion of the second sensing depth range.

14. The computing device of claim 11, wherein:

the first output coupler provides a first field of view; and the second output coupler provides a second field of view that differs from the first field of view.

15. The computing device of claim 11, comprising:

a first optical structure between the transmitter and the first output coupler; and a second optical structure between the transmitter and the second output coupler.

16. The computing device of claim 11, comprising optical structures over the output couplers; and wherein the first output coupler emits the beam through a first optical structure in response to the first output coupler being placed in the out-coupling state.

17. A method comprising:

emitting a first beam from a first output coupler associated with a first sensing depth range while a second output coupler associated with a second sensing depth does not emit the first beam;

receiving the first beam as reflected by one or more objects in the first sensing depth range and generating first data representative of the one or more objects in the first sensing depth range;

emitting a second beam from the second output coupler associated with a second sensing depth range while the first output coupler does not emit the second beam, wherein the second sensing depth range overlaps a portion of the first sensing depth range;

receiving the second beam as reflected by one or more objects in the second sensing depth range and generating second data representative of the one or more objects in the second sensing depth range; and generating 3D scan data based on the first data for the first sensing depth range and second data for the second sensing depth range.

18. The method of claim 17, wherein generating the 3D scan data comprises interpolating data for an overlap portion of 3D scan data based on data from the first data and data from the second data that correspond to the overlap portion.

19. The method of claim 17, wherein the emitting the first beam from the first output coupler occurs prior to the emitting the second beam from the second output coupler.

20. The method of claim 17, wherein:

receiving the first beam comprises receiving, with a receiver, the first beam as reflected;

receiving the second beam comprises receiving, with the receiver, the second beam as reflected;

the receiver is a first baseline distance from the first output coupler; and the receiver is a second baseline distance from the second output coupler.

* * * * *